UNITED STATES PATENT OFFICE.

WILLIAM M. GROSVENOR, OF NEW YORK, N. Y., ASSIGNOR TO PERKINS GLUE COMPANY, A CORPORATION OF PENNSYLVANIA.

VEGETABLE GLUE AND PROCESS OF MAKING SAME.

1,378,106.

Specification of Letters Patent.

Patented May 17, 1921.

No Drawing.

Application filed January 16, 1918. Serial No. 212,044.

*To all whom it may concern:*

Be it known that I, WILLIAM M. GROSVENOR, a citizen of the United States, and a resident of New York city, in the county of New York and State of New York, have invented certain new and useful Improvements in Vegetable Glue and Processes of Making the Same, of which the following is a specification.

My invention relates to improvements in vegetable glue and processes of making the same. It is now common to make vegetable glue by dissolving a suitable starch in about 3 parts or less by weight of water and caustic soda. Such glues are very viscous, and while being extensively used for gluing wood veneers, instead of animal glue, they are not generally suitable for other uses, as for example, to be applied with a brush for wood joint work, because of their relatively somewhat greater viscosity and lack of initial fluidity. The object of the present invention is to provide a glue which will contain more water and may thereby be rendered more fluid, but while possessing greater spread (*i. e.* square feet covered per pound of dry glue) nevertheless still having substantially the spreading qualities and final cohesiveness of animal glue for gluing up wood veneers and being capable of adhering to the wood with substantially the adhesiveness of animal glue, so that it is capable of more general use. Further and more specific features of the invention will more clearly appear from the detail description below of certain examples of the invention embodying my improvements in their preferred forms.

Example 1: 100 pounds of hydrolized or degenerated cassava starch are mixed with 700 pounds of water and 4 pounds of caustic soda added in a solution thereof containing 60 pounds of water. The caustic soda solution is added slowly while the temperature of the batch is raised to about 160° F. or somewhat less, and with continued agitation. When the batch has been transformed into glue and become clear, 25 pounds gum tragacanth, powdered to pass through a 60 mesh sieve, is added and stirred in while the temperature of the batch is maintained from 140° F. to 160° F. for 1 to 1½ hours. The gum tragacanth appears to act as a water absorptive material, so that a homogeneous, viscous, although relatively fluid glue is obtained, easily applied by a suitable brush, but owing apparently to the introduction of the gum tragacanth, the glue does not seem to penetrate the wood pores so readily as would be expected. While the gum tragacanth serves as a water absorptive material or water retaining material prior to the use of the glue so as to give it the required or desired fluidity and viscosity, the gum tragacanth does not interfere with the quick drying out of the water after the glue has been spread, so that the glue sets quickly in spite of the relatively large amount of water present.

In selecting the degenerated cassava starch, a starch having a viscosity of about 40 at 9 to 1 by Perkins viscosimeter is preferred. The Perkins viscosimeter may be constructed of brass tubing 1.295 inches outside diameter, 0.012 inch thick, and 3 inches long, and having a flat brass bottom 0.080 inch thick soldered into the end having a round center hole 0.070 inch in diameter, the total weight being 39.63 grams, and all edges being made smooth removing practically no weight, the hole being polished until the cup, placed quickly at its floating level in water at 60° F., floats upright and fills up to the point of sudden sinking by top overflow in 16 seconds.

In making the viscosity test above described, about 350 grams of starch may be mixed with 9 times its weight of water and boiled for 10 minutes with dry live steam at 100 pounds pressure and tested for viscosity while at about 195° F. by placing the Perkins cup viscosimeter therein and measuring the number of seconds for it to sink by top overflow.

When I speak of the viscosity being 40 at 9 to 1, I mean that it takes 40 seconds for the cup viscosimeter to sink when the amount of water in the boil up is 9 times the weight of the starch. When raw starches are being tested, 20 parts of water are used, or 20 to 1.

In applying the glue above described, and especially to veneers, it is, however, preferable to allow the surfaces to be glued to remain in contact for about 3 hours without any substantial pressure being exerted on the joint, after which time a pressure of about 100 pounds per square inch or more may be applied until the glue is practically dry and set. By allowing the glue to stand before completing the pressure of the glue into the wood pores, the glue loses some water to the wood or to the air, or both, and thickens somewhat, after which the relatively heavy pressure no longer causes excessive penetration or material squeezing out at the edges. I find that the water absorbed by the wood before the glue is pressed materially into the wood is more quickly dried out than is the water in the glue pressed into the wood. I find that the depth of penetration of the glue into the wood pores depends upon the fluidity of the glue and the pressure applied, and that the less the glue is forced into the wood, the quicker it will dry out, and that the less the glue is forced out sidewise, together with the less it is forced into the wood, the more glue is left between the wood surfaces to form the joint, although finally there must be sufficient penetration into the wood for the glue to take a firm hold thereon to form a secure joint.

Example 2: A solution of sodium aluminate is first prepared by dissolving freshly precipitated aluminum hydroxid containing about 15% actual $Al(OH)_3$, washed nearly from salts, in the molecular quantity of caustic soda in solid form (about 96% NaOH) to produce sodium aluminate. The solution should contain 22.3% of sodium aluminate $Na_3AlO_3$. About 24.6 pounds of this solution containing about 5.5 pounds of $Na_3AlO_3$ are added to 375 pounds of water and 100 pounds of the degenerated cassava starch base of Example 1, are then stirred in and the temperature raised to about 160° F. until the suspended starch and water are transformed into a homogeneous adhesive solution. The stirring is then continued until the batch is cold. If desired, the aluminum hydroxid may be added after the starch has been suspended in cold water containing the 3.5% of caustic soda and then the temperature raised to bring about solution, the liquid, upon the raising of the temperature, containing actually, or in effect, $Na_3AlO_3$. Sometimes it is desirable to add about 10% more of the $Na_3AlO_3$ than above indicated.

Certain qualities of commercial sodium aluminate may be used successfully in the proportion of 5½% based on the dry weight of the starch base, or the carbohydrate may be first dissolved with 3% of caustic soda and water and then 1.95% (dry weight) of moist freshly prepared aluminum hydroxid added gradually and thoroughly stirred in. More water may often be used, especially where a thinner glue is desired, the sodium aluminate apparently acting as a water retaining or water absorptive material to keep the glue thick enough so that it can be satisfactorily spread and will not be too much absorbed by the wood.

Example 3: 100 pounds of raw cassava starch having a viscosity of about 80 at 20 to 1 when tested by the above described method, are mixed with 700 pounds of water, and 10 pounds of caustic soda, dissolved in 100 pounds of water, are slowly added, with constant stirring, until the batch is transformed into a homogeneous solution, and then 30 pounds of gum tragacanth, powdered to pass through a 60 mesh to the inch sieve, are added and thoroughly stirred in for about 1½ to 2 hours. The resulting glue is thin enough to be applied with a suitable brush, preferably a wire brush. After the glue is applied and the wood faces placed in juxtaposition to one another, the joints are allowed to stand for ½ hour under their own weight, and then a pressure of 100 pounds per square inch is applied.

Example 4: The gum tragacanth may be introduced before the addition of the caustic, but the resulting glue in such case is more fluid than if added afterward, other things being the same. For example, 100 pounds of the degenerated starch base of Example 1 and 25 pounds of gum tragacanth, powdered to 60 mesh, are suspended in 700 pounds of water, and 4 pounds of caustic soda, dissolved in 60 pounds of water, are slowly added while the temperature of the batch is gradually raised to 150° F. to 160° F. with continual rapid agitation. The rapid agitation is best continued until the glue is cold and the glue may be applied cold preferably to both faces to be joined. The glued surfaces should be allowed to stand for about 3 hours without material pressure being applied to the joints, after which 100 pounds per square inch may be applied to the joints until the glue has practically set.

Other highly water absorbent material, preferably producing viscous solutions when mixed with water, may be used, as for instance viscose, or the xanthate of cellulose, or xanthate of starch may be used, or other material capable of containing, chemically or physically, considerable quantities of water while yet remaining substantially solid, as also other mineral salts, either absorbing water themselves, or causing the carbohydrate to do so without becoming excessively fluid, may be used. While I have spoken of cassava or tapioca starch as specific examples, because it seems to me to give better results, other starches, particularly potato, sago, etc., may be used with nearly, if not quite as good results.

Many other changes and modifications may be made without departing from the spirit and scope of the invention in its broader aspects, hence it is desired to include all variations coming within the language of the appended claims.

What I claim as new and desire to secure by Letters Patent, is:

1. The improved vegetable glue which comprises a viscous, substantially homogeneous fluid solution of a starchy carbohydrate base uncombined with sulfur and in about 4 parts or more of water, based on the dry weight of the carbohydrate base and having substantially the spreading and cohesive qualities of animal glue for gluing up wood veneers and being capable of adhering to wood with substantially the adhesiveness of animal glue for gluing up wood veneers, and containing a water absorbing material in sufficient amount to permit the glue solution to contain about 4 parts or more of water by weight per part of starchy carbohydrate base while leaving the glue sufficiently viscous to be spread.

2. The improved vegetable glue comprising a viscous but fluid solution of a starchy carbohydrate uncombined with sulfur and in about 4 parts or more of water per part of carbohydrate, and having substantially the adhesive, flowing and spreading qualities of animal glue for gluing up wood veneers, and containing a water absorptive material permitting the glue solution to contain about 4 or more parts of water by weight per part of starchy carbohydrate, while leaving the glue sufficiently viscous to be spread by glue spreading machinery.

3. The improved vegetable glue which comprises a viscous, substantially homogeneous solution of a starchy carbohydrate base uncombined with sulfur and in about 4 parts or more of water per part of base and having substantially the spreading and cohesive qualities of animal glue for gluing up wood veneers and being capable of adhering to wood with substantially the adhesiveness of animal glue for gluing up wood veneers, and containing an adhesive water absorptive material, permitting the glue solution to contain about 4 parts or more of water by weight per part of starchy carbohydrate base, while leaving the glue sufficiently viscous to be spread.

4. The improved vegetable glue which comprises a viscous, substantially homogeneous solution of a starchy carbohydrate base in water having substantially the spreading and cohesive qualities of animal glue for gluing up wood veneers and being capable of adhering to wood with substantially the adhesiveness of animal glue for gluing up wood veneers and containing gum tragacanth, permitting the glue solution to contain about 4 parts or more of water by weight per part of starchy carbohydrate base, while leaving the glue sufficiently viscous to be spread.

5. The improved vegetable glue comprising a solution of a starchy carbohydrate uncombined with sulfur, about 4 parts or more of water per part of carbohydrate and an alkaline solvent, and having substantially the spreading and cohesive qualities of animal glue for gluing up high grade wood veneers and being capable of adhering to wood with substantially the adhesiveness of animal glue for high grade wood veneers, and containing a water absorptive material, permitting the glue solution to contain about 4 parts or more of water by weight per part of starchy carbohydrate base, while leaving the glue sufficiently viscous to be spread.

6. A glue base comprising a starchy carbohydrate and gum tragacanth and having the property of being dissolved with water and a solvent of starch to produce a viscous solution having substantially the spreading and cohesive qualities of animal glue for gluing up wood veneers and being capable of adhering to wood with substantially the strength of animal glue for gluing up wood veneers.

7. The improved process of making vegetable glue, which consists in dissolving with an alkaline solvent of starch, a mixture of a starchy carbohydrate uncombined with sulfur and a water absorptive material in about 4 parts or more of water per part by weight of carbohydrate, the carbohydrate and proportions being such that the resulting glue has substantially the spreading and cohesive qualities of animal glue for gluing up wood veneers and is capable of adhering to wood with substantially the adhesiveness of animal glue for gluing up wood veneers.

8. The improved process of making vegetable glue, which consists in dissolving a starchy carbohydrate and gum tragacanth in water, the carbohydrate and proportions being such that the resulting glue has substantially the spreading and cohesive qualities of animal glue for gluing up wood veneers and is capable of adhering to wood with substantially the adhesiveness of animal glue for gluing up wood veneers.

9. The improved process of making vegetable glue, which consists in dissolving with an alkaline solvent of starch, a mixture of a starchy carbohydrate and gum tragacanth in about 4 parts or more of water by weight per part of starchy carbohydrate material, the carbohydrate being such that the resulting glue has substantially the spreading and cohesive qualities of animal glue for gluing up wood veneers and is capable of adhering to wood with substantially the adhesiveness of animal glue for gluing up wood veneers.

Signed at New York, in the county of New York and State of New York, this 15th day of January, A. D. 1918.

WILLIAM M. GROSVENOR.